United States Patent
Oswal et al.

(10) Patent No.: US 8,391,153 B2
(45) Date of Patent: Mar. 5, 2013

(54) DECOUPLING RADIO RESOURCE MANAGEMENT FROM AN ACCESS GATEWAY

(75) Inventors: Anand K. Oswal, Sunnyvale, CA (US); Timothy Stammers, Raleigh, NC (US); Jayaraman Iyer, Sunnyvale, CA (US); Parviz Yegani, Danville, CA (US)

(73) Assignee: Cisco Technology, Inc., San Jose, CA (US)

( * ) Notice: Subject to any disclaimer, the term of this patent is extended or adjusted under 35 U.S.C. 154(b) by 609 days.

(21) Appl. No.: 11/707,747

(22) Filed: Feb. 16, 2007

(65) Prior Publication Data
US 2007/0249334 A1    Oct. 25, 2007

Related U.S. Application Data

(60) Provisional application No. 60/774,493, filed on Feb. 17, 2006, provisional application No. 60/780,176, filed on Mar. 6, 2006.

(51) Int. Cl.
*G01R 31/08* (2006.01)
*H04L 12/28* (2006.01)
*H04M 1/00* (2006.01)

(52) U.S. Cl. .......... 370/236.1; 370/395.5; 370/401; 455/552.1

(58) Field of Classification Search ........ 455/422.1, 455/552.1; 370/236.1
See application file for complete search history.

(56) References Cited

U.S. PATENT DOCUMENTS

| | | | |
|---|---|---|---|
| 4,270,103 A | 5/1981 | Schroder | |
| 5,621,894 A | 4/1997 | Menezes et al. | |
| 5,901,352 A * | 5/1999 | St-Pierre et al. | 455/426.1 |
| 6,122,127 A | 9/2000 | Flinsbaugh | |
| 6,332,153 B1 | 12/2001 | Cohen | |
| 6,341,046 B1 | 1/2002 | Peterson | |
| 6,420,910 B1 | 7/2002 | Contreras | |
| 6,434,159 B1 | 8/2002 | Woodward et al. | |
| 6,791,957 B2 | 9/2004 | Kim | |
| 6,981,047 B2 | 12/2005 | Hanson et al. | |
| 6,989,856 B2 | 1/2006 | Firestone et al. | |
| 6,990,086 B1 | 1/2006 | Holur et al. | |
| 7,039,027 B2 | 5/2006 | Bridgelall | |
| 7,054,268 B1 | 5/2006 | Parantainen et al. | |
| 7,151,758 B2 | 12/2006 | Kumaki et al. | |

(Continued)

FOREIGN PATENT DOCUMENTS

| | | |
|---|---|---|
| CN | 1402451 A | 3/2003 |
| CN | 1507173 A | 6/2004 |

(Continued)

OTHER PUBLICATIONS

Pham, Tung Thanh, et al., "An Introduction to Radio Resource Management in Cellular Systems" obtained at http://www.item.ntnu.no/~fli/cac_tung.pdf.

(Continued)

*Primary Examiner* — Huy C Ho
(74) *Attorney, Agent, or Firm* — Patent Capital Group

(57) ABSTRACT

Particular embodiments provide an access gateway that facilitates communication between a plurality of access technologies. The access gateway facilitates data communication with an access terminal through a bearer path. A radio resource manager is configured to provide radio resource management functions for the communications. The radio resource manager is decoupled from the bearer path and provides control of radio transmission characteristics for the bearer path to the gateway. Because the radio resource manager is not in the bearer path, the access gateway may be access technology agnostic. Thus, the access gateway does not need to have access-specific modules based on the radio technology for each bearer path.

16 Claims, 3 Drawing Sheets

U.S. PATENT DOCUMENTS

| | | | |
|---|---|---|---|
| 7,177,624 | B2 | 2/2007 | Sivanandan et al. |
| 7,266,091 | B2 | 9/2007 | Singh et al. |
| 7,333,451 | B1 | 2/2008 | Khalil et al. |
| 7,382,748 | B1 | 6/2008 | Bharatia et al. |
| 7,421,732 | B2 | 9/2008 | Costa-Requena et al. |
| 7,477,657 | B1 | 1/2009 | Murphy et al. |
| 7,545,761 | B1 | 6/2009 | Kalbag |
| 7,657,259 | B2 | 2/2010 | Yegani et al. |
| 7,675,704 | B2 | 3/2010 | Dean |
| 7,751,830 | B2 | 7/2010 | Iyer |
| 7,831,996 | B2 | 11/2010 | Dholakia et al. |
| 7,864,693 | B2 | 1/2011 | Burman et al. |
| 2002/0045450 | A1 | 4/2002 | Shimizu et al. |
| 2002/0070801 | A1 | 6/2002 | Ferianz |
| 2002/0105922 | A1 | 8/2002 | Jabbari et al. |
| 2002/0110104 | A1 | 8/2002 | Surdila et al. |
| 2002/0126626 | A1 | 9/2002 | Singh |
| 2003/0142650 | A1 | 7/2003 | Fan |
| 2003/0182431 | A1 | 9/2003 | Sturniolo et al. |
| 2003/0234685 | A1 | 12/2003 | Ranmuthu |
| 2004/0009770 | A1 | 1/2004 | Sivanandan et al. |
| 2004/0085667 | A1 | 5/2004 | Chung et al. |
| 2004/0127258 | A1 | 7/2004 | Taketsugu |
| 2004/0225878 | A1 | 11/2004 | Costa-Requena et al. |
| 2004/0246962 | A1 | 12/2004 | Kopeikin et al. |
| 2004/0260796 | A1 | 12/2004 | Sundqvist et al. |
| 2005/0007954 | A1 | 1/2005 | Sreemanthula et al. |
| 2005/0009516 | A1* | 1/2005 | Stumpert et al. .............. 455/428 |
| 2005/0050246 | A1 | 3/2005 | Lakkakorpi et al. |
| 2005/0078824 | A1 | 4/2005 | Malinen et al. |
| 2005/0088203 | A1 | 4/2005 | Price, Jr. |
| 2005/0091539 | A1 | 4/2005 | Wang et al. |
| 2005/0099492 | A1 | 5/2005 | Orr |
| 2005/0120213 | A1 | 6/2005 | Winget et al. |
| 2005/0136949 | A1 | 6/2005 | Barnes |
| 2005/0162221 | A1 | 7/2005 | Barnett et al. |
| 2005/0174669 | A1 | 8/2005 | Contreras et al. |
| 2005/0180041 | A1 | 8/2005 | Kajiyama et al. |
| 2005/0265276 | A1 | 12/2005 | Takeda et al. |
| 2005/0271013 | A1 | 12/2005 | Shaheen |
| 2006/0007862 | A1 | 1/2006 | Sayeedi et al. |
| 2006/0026671 | A1 | 2/2006 | Potter et al. |
| 2006/0028986 | A1 | 2/2006 | Kwon et al. |
| 2006/0067271 | A1 | 3/2006 | Chen et al. |
| 2006/0070111 | A1 | 3/2006 | Kurosawa |
| 2006/0095943 | A1 | 5/2006 | Demircin et al. |
| 2006/0142008 | A1 | 6/2006 | Lee et al. |
| 2006/0193272 | A1 | 8/2006 | Chou et al. |
| 2006/0217112 | A1 | 9/2006 | Mo |
| 2006/0251038 | A1 | 11/2006 | Tamura et al. |
| 2006/0264207 | A1 | 11/2006 | Tamura et al. |
| 2006/0268845 | A1* | 11/2006 | He et al. .................. 370/352 |
| 2007/0014259 | A1 | 1/2007 | Fajardo et al. |
| 2007/0060097 | A1 | 3/2007 | Edge et al. |
| 2007/0162751 | A1 | 7/2007 | Braskich et al. |
| 2007/0206556 | A1 | 9/2007 | Yegani |
| 2007/0208855 | A1 | 9/2007 | Yegani |
| 2007/0213097 | A1* | 9/2007 | Taketsugu .................. 455/560 |
| 2007/0217406 | A1 | 9/2007 | Riedel et al. |
| 2007/0242638 | A1 | 10/2007 | Arkko et al. |
| 2007/0248078 | A1 | 10/2007 | Gundavelli |
| 2007/0281743 | A1 | 12/2007 | Palin et al. |
| 2008/0043618 | A1 | 2/2008 | Iyer |
| 2008/0212503 | A1 | 9/2008 | Lipford et al. |
| 2008/0259881 | A1 | 10/2008 | Hancock et al. |
| 2009/0163207 | A1 | 6/2009 | Randall et al. |

FOREIGN PATENT DOCUMENTS

| | | |
|---|---|---|
| CN | 101385316 | 3/2009 |
| CN | 101438344 A | 5/2009 |
| EP | 1075123 | 2/2001 |
| EP | 1994725 | 8/2007 |
| EP | 1997325 | 12/2008 |
| EP | 1997105 | 6/2010 |
| EP | 1429567 | 2/2012 |
| WO | WO 03/063441 | 7/2003 |
| WO | WO 03/084096 | 10/2003 |
| WO | WO 2004/004378 | 1/2004 |
| WO | WO 2006/007574 | 1/2006 |
| WO | WO 2007/098165 | 8/2007 |
| WO | WO 2007/098245 | 8/2007 |
| WO | WO 2007/104050 | 9/2007 |

OTHER PUBLICATIONS

Jan. 4, 2012 Response to PRC Fourth Office Action from State Intellectual Property Office from Chines Application 200780005846.2; 10 pages [English translation of Claims only].

USPTO Dec. 28, 2011 Non-Final Office Action from U.S. Appl. No. 11/714,413.

USPTO Feb. 29, 2012 Response to Non-Final Office Action mailed Dec. 28, 2012 from U.S. Appl. No. 11/714,413.

EPO Jan. 19, 2012 Supplementary European Search Report and Written Opinion from Application EP07751189; 5 pages.

EPO Feb. 6, 2012 Supplementary European Search Report and Written Opinion from Application EP07751384; 8 pages.

"3GPP2," 3rd Generation Partnership Project 2, cdma2000 Wireless IP Network Standard: Introduction, Version 1.0, Feb. 2006, 3GPP2 X.S0011-001-D.

"3GPP2," 3rd Generation Partnership Project 2, cdma2000 Wireless IP Network Standard: Introduction, Version 1.0, Feb. 2006, 3GPP2 X.S0011-002-D.

"3GPP2," 3rd Generation Partnership Project 2, cdma2000 Wireless IP Network Standard: Introduction, Version 1.0, Feb. 2006, 3GPP2 X.S0011-003-D.

"3GPP2," 3rd Generation Partnership Project 2, cdma2000 Wireless IP Network Standard: Introduction, Version 1.0, Feb. 2006, 3GPP2 X.S0011-004-D.

"3GPP2," 3rd Generation Partnership Project 2, cdma2000 Wireless IP Network Standard: Introduction, Version 1.0, Feb. 2006, 3GPP2 X.S0011-005-D.

"3GPP2," 3rd Generation Partnership Project 2, cdma2000 Wireless IP Network Standard: Introduction, Version 1.0, Feb. 2006, 3GPP2 X.S0011-006-D.

EPO Supplementary European Search Report and Search Opinion mailed Dec. 3, 2009 for Appiication No. 07758263.3; 6 pages.

PCT International Search Report mailed Jun. 12, 2008 for PCT/US07/04617; 2 pages.

PCT International Preliminary Report on Patentability and Written Opinion of the International Searching Authority mailed Aug. 19, 2008 for PCT/US07/04617; 8 pages.

PCT International Search Report mailed Feb. 7, 2008 for PCT/US07/63692; 1 page.

PCT International Preliminary Report on Patentability and Written Opinion of the International Searching Authority mailed Sep. 9, 2008 for PCT/US07/63692; 4 pages.

PCT International Search Report mailed Jul. 28, 2008 for PCT/US07/004415; 1 page.

PCT International Preliminary Report on Patentability and Written Opinion of the International Searching Authority mailed Sep. 9, 2008 for PCT/US07/004415; 4 pages.

PCT International Search Report mailed Jun. 5, 2008 for PCT/US08/55405; 1 page.

PCT International Preliminary Report on Patentability and Written Opinion of the International Searching Authority mailed Sep. 8, 2008 for PCT/US08/55405; 6 pages.

Perkins, C., "IP Mobility Support for IPv4," Network Working Group RFC3344, Aug. 2002; http://rft.sunsite.dk/rfc/rfc3344.htl, 99 pages.

PRC First Office Action mailed Nov. 18, 2010 from the State Intellectual Property Office of the People's Republic of China from application CN 200780005907.5; 17 pages.

Response dated Apr. 1, 2011 to PRC First Office Action from the State Intellectual Property Office of the People's Republic of China mailed Nov. 18, 2010 from application CN 200780005907.5; 14 pages.

PRC First Office Acton mailed Nov. 12, 2009 from the State Intellectual Property Office of the People's Republic of China from application CN 200780005846.2; 23 pages.

Response dated Apr. 6, 2010 to PRC First Office Action from the State Intellectual Property Office of the People's Republic of China mailed Nov. 12, 2009 from application CN 200780005846.2; 31 pages.

PRC Second Office Action mailed May 24, 2010 from the State Intellectual Property Office of the People's Republic of China from application CN 200780005846.2; 13 pages.

Response dated Aug. 9, 2010 to PRC Second Office Action from the State Intellectual Property Office of the People's Republic of China mailed May 24, 2010 from application CN 200780005846.2; 9 pages.

Yegani, P. et al., "GRE Key Extension for Mobile IPv4," Network Working Group, Aug. 5, 2006, 9 pages.

Yutalo, et al., "Re-thinking Security in IP based Micro-Mobility," [Retrieved and printed May 5, 2011] www.tcs.hut.fi/Studies/T-79.5401/2005AUT/ISCO4-Vlitalo-e-al.pdf; 12 pages.

USPTO Mar. 18, 2011 Final Rejection from U.S. Appl. No. 11/714,566.

USPTO Jun. 7, 2012 Final Office Action from U.S. Appl. No. 11/714,413.

PRC May 18, 2011 Second Office Action from the State Intellectual Property Office of the People's Republic of China from application 200780005907.5 [English translation only—Chinese version not available]; 2 pages.

Jun. 20, 2011 Response to USPTO Final Rejection from U.S. Appl. No. 11/714,566.

EPO Jun. 13, 2012 Response to Communication from European Application No. 07751384.4; 10 pages.

Aug. 2, 2011 Response to PRC Second Office Action from State Intellectual Property Office from Chinese Application 200780005907.5 [English translation of pending claims only]; 11 pages.

PRC Jun. 30, 2011 Third Office Action mailed from the State Intellectual Property Office of the People's Republic of China from Chinese Application No. 200780005846.2]; 7 pages.

Sep. 15, 2011 Response to PRC Third Office Action from State Intellectual Property Office from Chinese Application 200780005846.2 [English translation of pending claims only]; 10 pages.

PRC Oct. 19, 2011 Fourth Office Action mailed from the State Intellectual Property Office of the People's Republic of China from Chinese Application No. 200780005846.2; 7 pages.

* cited by examiner

DECOUPLING RADIO RESOURCE MANAGEMENT FROM AN ACCESS GATEWAY

CROSS REFERENCES TO RELATED APPLICATIONS

This application claims priority from U.S. Provisional Patent application Ser. No. 60/774,493 filed on Feb. 17, 2006, and U.S. Provisional Patent application Ser. No. 60/780,176 filed on Mar. 6, 2006, both of which are hereby incorporated by reference in their entirety for all purposes.

TECHNICAL FIELD

Particular embodiments generally relate to networking.

BACKGROUND

In internet protocol (IP) network architectures, a large number of access technologies communicate through an access gateway. For example, mobile technologies, such as cellular, wireless fidelity (WiFi), WiMAX, internet protocol (IP), etc. may communicate together through the access gateway.

In cellular communications, a radio network controller (RNC) includes a radio resource manager and a radio bearer. The radio bearer controls the bearer path for media that flows from an access terminal through a base transceiver station (BTS) to the access gateway. Also, the radio resource manager provides radio resource management functions in the control path. Different access technologies may require different radio resource management functions. For example, code division multiplex access (CDMA), WiFi, global system for mobile communications (GSM) may each require configuration of different radio transmission characteristics that are managed radio resource managers. The control path and bearer path are combined for each access technology. Accordingly, the access gateway needs to have independent modules that handle the radio resource functions for each different access technology. Thus, when changes need to be made to the network, such as a different radio type is included, a new module needs to be installed in the access gateway or an existing one needs to be changed. This does not make the access gateway portable and requires undesirable changes that need to be made.

DESCRIPTION OF EXAMPLE EMBODIMENTS

Overview

Particular embodiments provide an access gateway that facilitates communication between a plurality of access technologies. The access gateway facilitates data communication with an access terminal through a bearer path. A radio resource manager is configured to provide radio resource management functions for the communications. The radio resource manager is decoupled from the bearer path and provides control of radio transmission characteristics for the bearer path to the gateway. Because the radio resource manager is not in the bearer path, the access gateway may be access technology agnostic. Thus, the access gateway does not need to have access-specific modules based on the radio technology for each bearer path.

Example Embodiments

Figure 1:
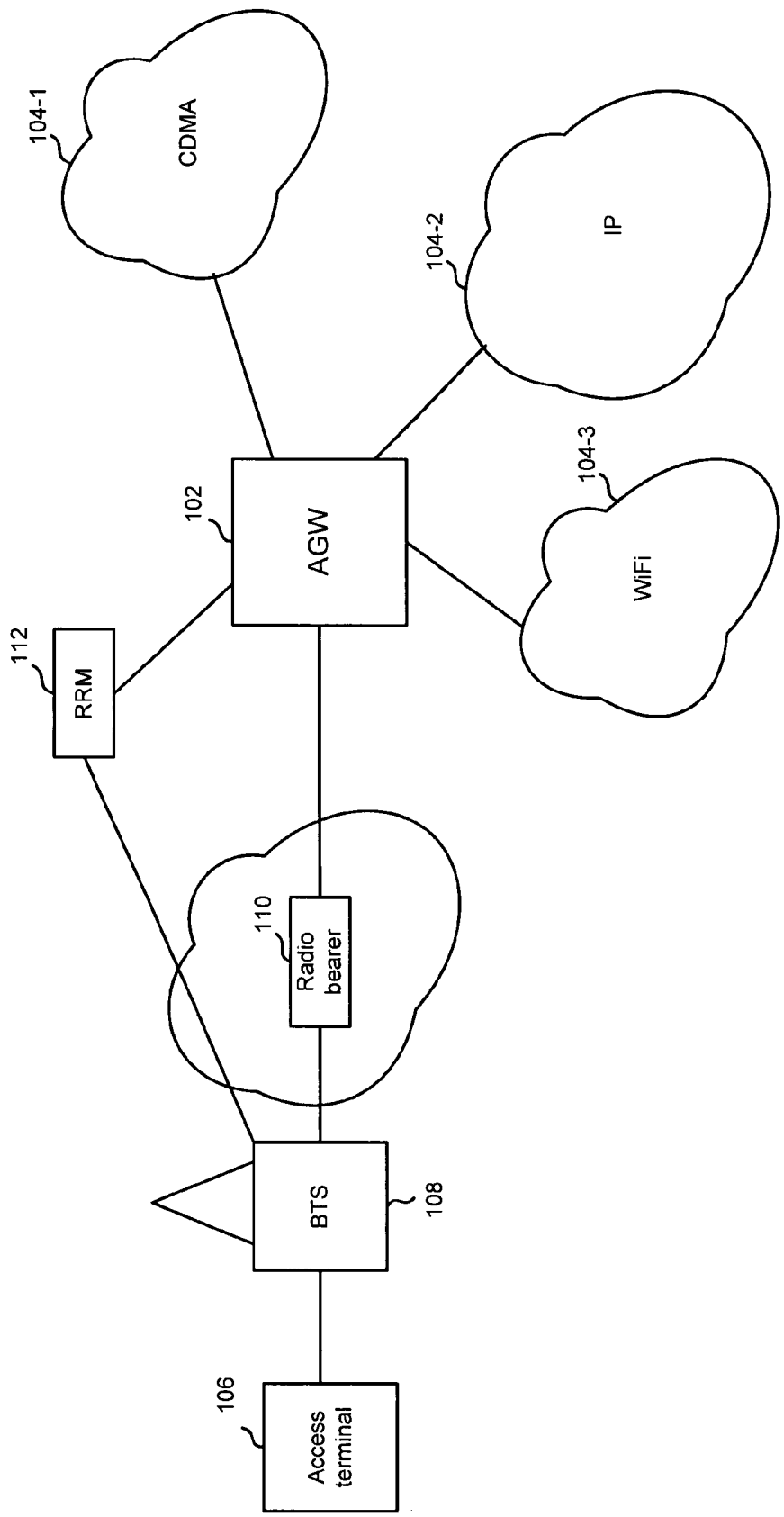
FIG. 1 depicts an example of a system showing a decoupled radio resource manager.

FIG. 1 depicts an example of a system showing a decoupled radio resource manager. As shown, an access gateway 102 is coupled to various access technologies. For example, a WiFi network 104-1, CDMA network 104-2, IP network 104-3, cellular network 104-4 are coupled to access gateway 102. An access terminal 106, a base transceiver station 108 and a radio bearer 110 are provided and may communicate with access gateway 102 through a bearer path. A radio resource manager 112 provides radio resource management functions for access gateway 102 and/or base transceiver station 108.

Access terminal 106 may be any endpoint. For example, access terminal 106 may be a mobile station or node, such as a cellular telephone, personal digital assistant (PDA), Blackberry-like device, laptop computer, personal computer, set-top box, or any other wireless access device. Access terminal 106 is configured to participate in any communications, such as voice communications, video communications, etc. through an access technology. The access technologies include wireless and wire-line technologies, such as CDMA, WiMAX, WiFi, GSM, IP, etc.

Base transceiver station 108 facilitates wireless communication between access terminal 106 and cellular network 104-4. Base transceiver station 108 terminates the layer 2. For example, base transceiver station 108 terminates the media access control (MAC)/physical (PHY) layers and is responsible for radio-specific functions, such as reverse link frame selection and radio link protocol termination. An IP protocol interconnects base transceiver station 108 with access gateway 102. Thus, base transceiver station 108 may send data through an IP network to access gateway 102.

Radio bearer 110 provides the bearer path for communications between access terminal 106 and access gateway 102. The bearer path is the path in which media flows from access terminal 106 to access gateway 102.

To provide radio communications, a radio resource manager also needs to provide radio resource management control. This provides control for radio transmission characteristics. Some characteristics that are controlled include transmit power, channel allocation, handover criteria, modulation scheme, error coding scheme, radio link supervision (both active and idle OTA channels), radio channel configuration management, radio channel allocation/de-allocation (both for normal operation and traffic bursts), channel power control, channel encoding/decoding, interleaving, and priority access for radio resources, etc.

Access gateway 102 may not include radio specific modules that are used to provide radio resource management control. However, access gateway 102 can interact with various radio technologies using radio resource manager 112, which is decoupled from access gateway 102. Access gateway 102 does not have to have a specific module for each radio technology. For example, in CDMA, certain radio measurements need to be made that are different from another access technology, such as GSM. CDMA may have different parameters that are controlled differently from GSM. If radio resource management for CDMA is included in access gateway 102, then a radio-specific module is needed for just CDMA. However, because the different radio technologies are managed using a decoupled radio resource manager 112, access gateway 102 does not have to be designed to handle the radio functions for each radio technology. This provides scalability when different radio technologies are added for use with access gateway 102.

Radio resource manager 112 is also decoupled from radio bearer 110. In this case, the bearer path is decoupled from the control path. When a bearer path is established with access gateway 102 from access terminal 106, control information is handled by radio resource manager 112 through a path from base transceiver station 108 to radio resource manager 112. For example, an opaque channel exists from base transceiver station 108 and radio resource manager 112 through access gateway 102. Thus, communications from base transceiver station 108 to radio resource manage 112 may be tunneled though access gateway 102. However, access gateway 102 is decoupled from interpreting and providing any control information. Rather, the information is sent between radio resource manager 112 and base transceiver station 108. In another embodiment, base transceiver station 108 may communicate with radio resource manager 112 without going through access gateway 102.

Accordingly, decoupling radio resource manager 112 from the bearer path allows access gateway 102 to be access—technology agnostic. If the bearer path is decoupled from the radio resource management functions, then IP packets are sent to access gateway 102. The IP packets may be tunneled through a network to access gateway 102. For example, the data is removed from the radio protocol by base transceiver station 108 and tunneled to access gateway 102 in IP packets. Thus, the IP packets can be processed without being concerned with the radio specific technology that originated them. Accordingly, access gateway 102 is the point of convergence for IP functionality for the access network and transport network terminations.

Particular embodiments provide a clear separation between layer 2 and layer 3. Separating layer 2 from layer 3 allows radio-specific functions to be implemented in radio resource manager 112 while other network functions are in layer 3 at access gateway 102. For example, a full suite of IP capabilities with respect to mobility, security, QoS, etc. is provided in access gateway 102. This allows customers to move to new packet radio technologies as they become available because they only need to add access/radio dependent elements to radio resource manager 112. Thus, access gateway does not need to be radically changed to support the new radio technologies. However, if radio specific modules were included in access gateway 102, then changes to the radio resource functions need to be included in access gateway 102. This may require major modifications to access gateway 102.

Also, decoupling radio resource manager 112 from the bearer path is useful as the performance in radio continues to increase with each new generation of technology. It takes into account that the bearer and control paths may evolve in different ways from different suppliers. The separation also allows vendors to concentrate on separate functions. For example, the access gateway vendor can concentrate the bearer path and another vendor can concentrate on the radio resource management functions. Thus, the control path and bearer path can be developed independently. This also provides more choices for a customer.

Having radio resource manager 112 loosely-coupled from access gateway 102 may lead to a less costly system upgrade to support seamless inter-technology handles (i.e., most network components are being used). Also, the upgrade of current network infrastructure to offer global services in a heterogeneous environment (3gpp/2, WiFi, WiMAX, etc.) is provided. In this case, when updates need to be made to radio resource management functions, radio resource manager 112 may be altered. However, access gateway 102 does not need to be changed. Rather, when the radio resource management functions are needed, radio resource manager 112 is communicated with to determine parameters needed. Thus, the scalability of access gateway 102 with respect to offering access to different access technologies is provided. Further, access gateway 102 may be re-used in different environments in which different access technologies are supported.

Figure 2:
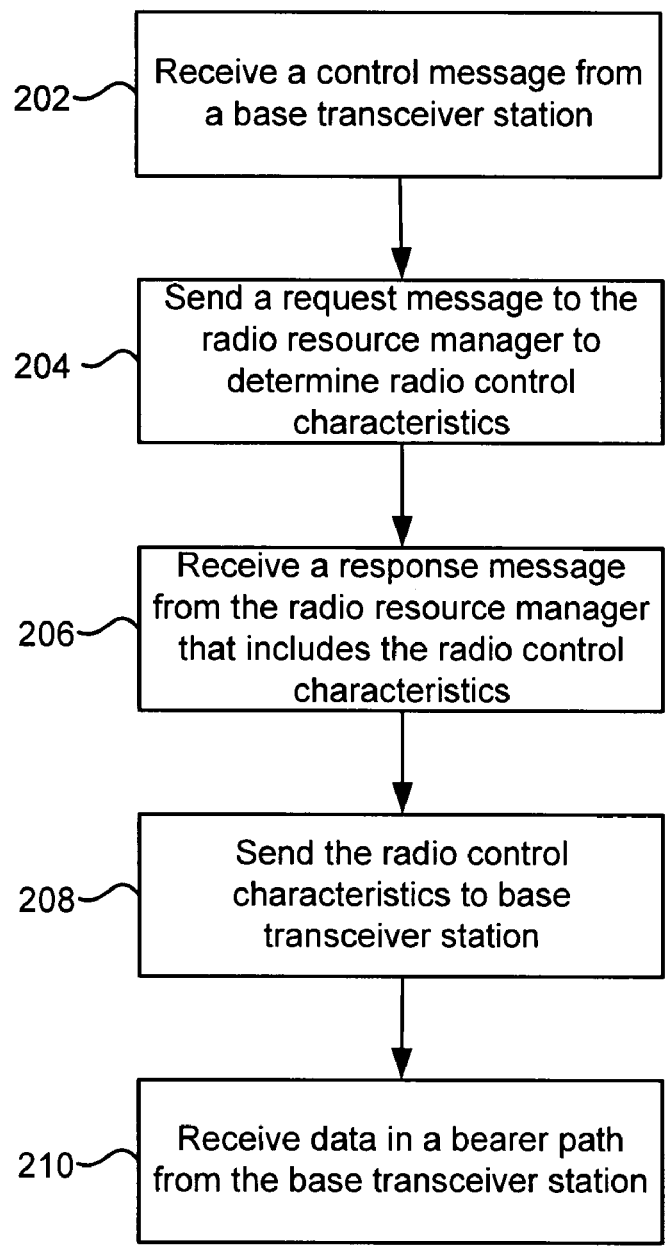
FIG. 2 depicts an example of a method for providing communications using a decoupled radio resource manager.

FIG. 2 depicts an example of a method for providing communications using a decoupled radio resource manager 112. Step 202 receives a control message from a base transceiver station 108. The message may be for any signaling in the control path. For example, base transceiver station 108 may want to set up a radio link with access terminal 106.

Step 204 sends a request message to radio resource manager 112 to determine radio control characteristics. For example, the control message may be tunneled from base transceiver station 108 to access gateway 102. Access gateway 102 provides a channel to radio resource manager 112 in which the control message may be sent.

Step 206 receives a response message from radio resource manager 112 that includes the radio control characteristics. For example, information for setting up the radio link is received. In other embodiments, radio resource manager 112 may send the radio control characteristics to base transceiver station 108 without going through access gateway 102.

Step 208 sends the radio control characteristics to base transceiver station 108. Base transceiver station 108 is configured to use the radio control characteristics to set up a radio link with access terminal 106.

In step 210, after the radio link is set up, access gateway 102 receives data in a bearer path from base transceiver station 108. The data may be sent in IP packets that are sent through an IP network. The data sent in IP packets may have radio characteristics removed from data that is sent over the air from access terminal 106 to base transceiver station 108.

An example of how radio resource manager 112 is used will now be described. Access terminal 106 may first attach to a base transceiver station. For example, access terminal 106 may be turned on and attaches to the base transceiver station. A radio link then needs to be established to allow access terminal 106 to make calls. Radio resource manager 112 is contacted to provide the radio resource management functions. For example, the base transceiver station may contact radio resource manager 112. There may be a list of base transceiver stations (not shown) that access terminal 106 can establish a radio link with. Radio resource manager 112 selects one of the base transceiver stations. For example, base transceiver station 108 may be selected.

Radio resource manager 112 contacts base transceiver station 108 to instruct it to acquire access terminal 106. Other parameters may also be exchanged to configure a radio link. Base transceiver station 108 can then establish a radio link with access terminal 106. The radio link may be set up without involving access gateway 102. For example, radio resource manager 112 may communicate with base transceiver station 108 without messages going through access gateway 102. Also, the messages may be sent through access gateway 102. Also, the messages may be sent (routed via) access gateway 102, in a manner that does not require interpretation by the access gateway 102.

Base transceiver station 108 may also set up a link with access gateway 102. This link may be IP-based. This is the bearer path in which packets of data may flow through radio bearer 110 to access gateway 102. The bearer path packets are those used for end user services and carry the data itself. The signaling exchange to set up the radio link is handled by radio resource manager 112. Access gateway 102 does not need to perform these functions. However, the signaling messages may flow through access gateway 102 to base transceiver station 108 through a channel. But, this channel is IP-based and not related to the radio specific technology. Also, radio resource manager 112 may contact base transceiver station 108 without going through access gateway 102.

Accordingly, the radio link is set up by radio resource manager 112 through a control path. Access gateway 102 sets up an IP-based link separately. The control path is decoupled from the bearer path. This allows gateway 102 to port to other technologies easily. For example, if a user is using a CDMA access terminal 106 and then later buys a GSM access terminal 106, if the radio resource management functions are tightly coupled with access gateway 102, then modifications as to how access gateway 102 handles the radio-specific functions related to GSM need to be made. However, with radio resource manager 112 decoupled from access gateway 102, little change needs to be made to access gateway 102. This is because access gateway is still receiving IP packets from base transceiver station 108. However, the different radio functions are being handled by radio resource manager 112.

Figure 3:
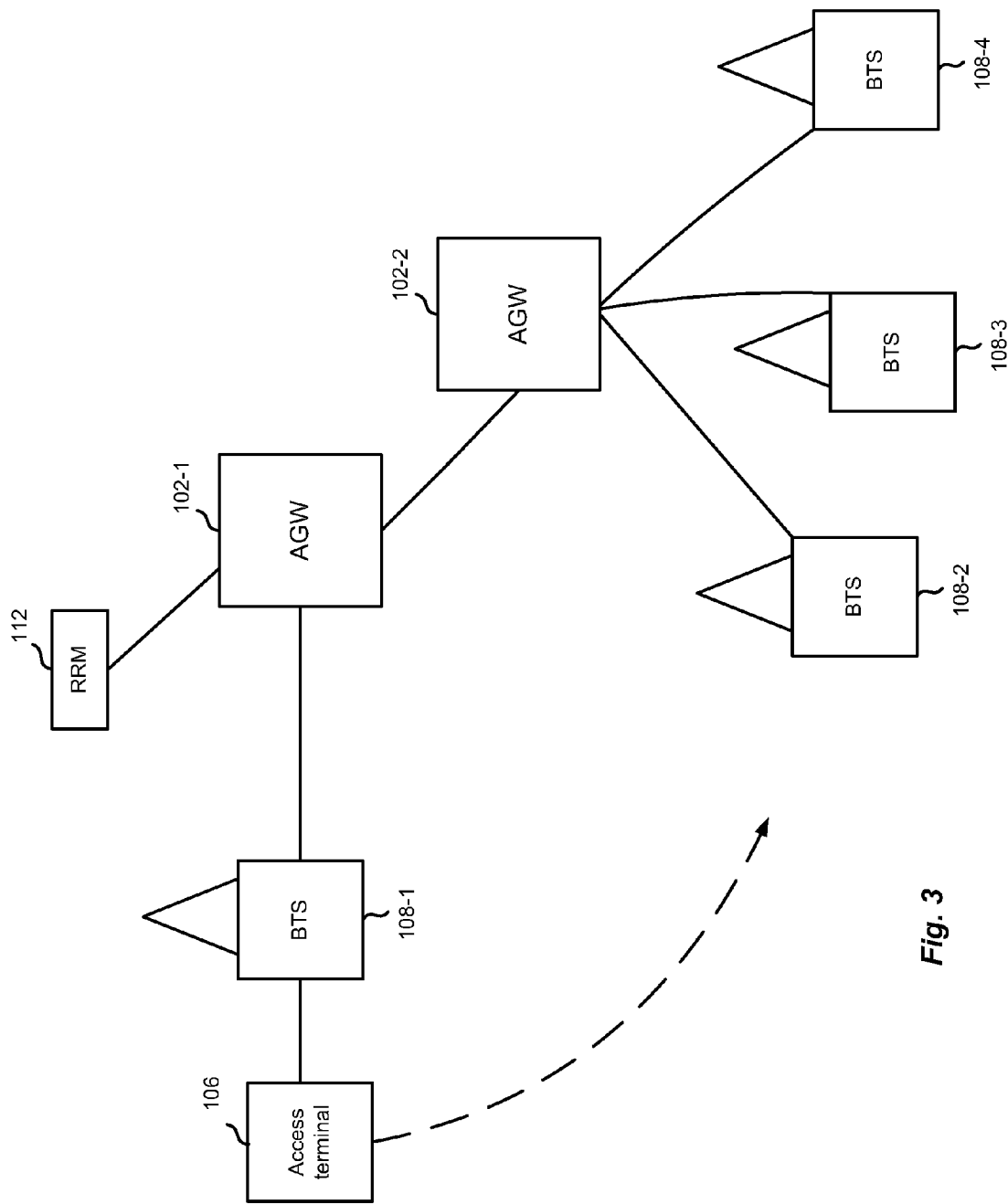
FIG. 3 depicts an example of a system providing session mobility.

FIG. 3 depicts an example of a system providing session mobility. Hand-off control regarding predictive and hard handovers requires coordination between the session mobility and radio resource management functions. Base transceiver station 108 and radio resource manager 112 can coordinate the hand-over through access gateway 102. Session mobility functions and the bearer path are in the same functional element while radio resource management is handled by a different functional element. In one embodiment, access gateway 102 may handle the session mobility and bearer path functions while radio resource manager 112 handles the radio resource management.

As shown, an access gateway 102-1 and an access gateway 102-2 are provided. Access terminal 106 is attached to base transceiver 108-1. In one case, access gateway 102-1 may want to move access terminal 106 to a different base transceiver station. In this case, access gateway 102-1 may get a list of cell sites (e.g., base transceiver stations 108) from resource radio manager 112. These sites are sent to access gateway 102-2.

Access gateway 102-2 may then determine if bearer path resources are available based on the cell sites. For example, it may be determined that base transceiver station 108-2 is available. Access gateway 102-2 may then send a message back to access gateway 102-1 stating that the base transceiver station 108-2 has resources available. Radio resource manager 112 is then contacted and the switch to base transceiver station 108-2 is initiated. Access terminal 106 may then be transferred to base transceiver station 108-2. For example, radio resource manager 112 may signal to base transceiver station 108-2 to acquire access terminal 106.

In one embodiment, the network may be made ready to start packet flow once the access terminal 106 is attached to base transceiver station 108-2. For example, it may take some time to set up a flow for packets for access terminal 106. In this case, radio resource manager 112 may signal information needed to set up the flow to access gateway 102. Access gateway 102-2 may then set up the flow before access terminal 106 is transferred to base transceiver station 108-2.

Once the flow is set up, access terminal 106 may be transferred to base transceiver station 108-2. The flow of packets in the bearer path for access terminal 106 may start immediately upon the transfer. Accordingly, latency is reduced in the transfer.

Although the description has been described with respect to particular embodiments thereof, these particular embodiments are merely illustrative, and not restrictive. For example, radio resource manager 112 may be collocated with a base station.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as standalone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that what is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. An apparatus comprising:
   one or more computer processors; and
   logic encoded in one or more non-transitory computer readable storage media for execution by the one or more processors and when executed operable to:
   facilitate communications between a plurality of access technologies requiring different radio resource control functions, wherein the apparatus provides information sent from an updated radio resource manager to a base transceiver station to provide radio control for one or more access terminals, and said apparatus facilitates one or more communications of media with the one or more access terminals through one or more bearer paths flowing through the apparatus, the one or more bearer paths flowing from the base transceiver station through a radio bearer to the apparatus without going through the updated radio resource manager,
   wherein the updated radio resource manager is decoupled from one or more bearer paths and not co-located with the apparatus, wherein the updated radio resource manager provides radio resource control functions for communicating media through the one or more bearer paths using the plurality of access technologies requiring different radio resource control functions, the radio resource control functions being provided through a control path from the base transceiver station through the updated radio resource manager to the apparatus without going through the radio bearer.

2. The apparatus of claim 1, wherein the logic is further operable to process data for the one or more access terminals through the one or more bearer paths, the data being sent through an IP-based network.

3. The apparatus of claim 2, wherein the data does not include radio-specific characteristics.

4. The apparatus of claim 1, wherein the logic is further operable to communicate with different access technologies using the radio resource manager without using access specific modules for specific access technologies.

5. A method comprising:
   updating a radio resource manager;
   receiving, at an access gateway, a control message from a base transceiver station, the control message being sent in a control path from the base transceiver station through the updated radio resource manager without going through a radio bearer, the access gateway facilitating communications between a plurality of access technologies requiring different radio resource control functions;
   sending a request message to the updated radio resource manager in the control path to determine radio control characteristics for an access technology in the plurality of access technologies;
   receiving a response message from the updated radio resource manager in the control path including the radio control characteristics for a radio resource control function associated with the access technology;
   sending the radio control characteristics to the base transceiver station through the control path, wherein the base transceiver station is configured to use the radio control characteristics for a bearer path with an access terminal, the bearer path flowing through the base transceiver station and the radio bearer to the access gateway without going through the updated radio resource manager, wherein the updated radio resource manager is decoupled and not co-located with the access gateway communicating media through the bearer path; and providing radio control for the access terminal by sending information from the updated radio resource manager to the base transceiver station.

6. The method of claim 5, wherein the radio control characteristics are useable to set up a radio link for the access terminal.

7. The method of claim 5, wherein the bearer path comprises an IP link with the base transceiver station.

8. The method of claim 7, further comprising receiving data packets from the base transceiver station through the IP link, wherein the data packets have radio specific information that is used to send data in the data packets from the access terminal to the base transceiver station removed.

9. The apparatus of claim 8, wherein the access gateway is configured to process data for the access terminal through the bearer path, the data being sent through an IP-based network.

10. The apparatus of claim 9, wherein the updated radio resource manager is configured to communicate with a base transceiver station to provide radio control for the access terminal.

11. The apparatus of claim 8, wherein the access gateway communicates with different access technologies without using access specific modules for specific access technologies.

12. The apparatus of claim 9, wherein the updated radio resource manager is configured to communicate with a base transceiver station to provide radio control for the access terminal.

13. The apparatus of claim 12, wherein the updated radio resource manager is configured to communicate with the base transceiver station though a channel through the access gateway.

14. The apparatus of claim 9, wherein the access gateway communicates with different access technologies without using access specific modules for specific access technologies.

15. An apparatus comprising:
means for receiving, at an access gateway, a control message from a base transceiver station, the control message being sent in a control path from the base transceiver station through an updated radio resource manager without going through a radio bearer, the access gateway facilitating communications between a plurality of access technologies requiring different radio resource control functions;

means for sending a request message to the updated radio resource manager in the control path to determine radio control characteristics for an access technology in the plurality of access technologies;

means for receiving a response message from the updated radio resource manager in the control path including the radio control characteristics for a radio resource control function associated with the access technology;

means for sending the radio control characteristics to the base transceiver station through the control path, wherein the base transceiver station is configured to use the radio control characteristics for a bearer path with an access terminal, the bearer path flowing through the base transceiver station and the radio bearer to the access gateway without going through the updated radio resource manager, wherein the updated radio resource manager is decoupled and not co-located with the access gateway communicating media through the bearer path and provides radio control for the access terminal by sending information from the updated radio resource manager to the base transceiver station.

16. A system comprising:
an access gateway configured to facilitate communications between a plurality of access technologies requiring different radio resource management functions, wherein the access gateway facilitates one or more communications of media with one or more access terminals through one or more bearer paths, the one or more bearer paths flowing from a base transceiver station through a radio bearer to the access gateway; and an updated radio resource manager decoupled and not co-located with the access gateway, the radio resource control being provided through a control path from the base transceiver station through the updated radio resource manager to the access gateway without going through the radio bearer, the updated radio resource manager configured to provide radio resource management control to the base transceiver station through the control path for the one or more communications through the one or more bearer paths and provide radio control to the access gateway through the control path for communicating media through the one or more bearer paths using the plurality of access technologies requiring different radio resource management functions, and said updated radio resource manager providing radio control for the one or more access terminals by sending information from the updated radio resource manager to the base transceiver station.

* * * * *